US011321241B2

(12) United States Patent
Kotra et al.

(10) Patent No.: US 11,321,241 B2
(45) Date of Patent: May 3, 2022

(54) TECHNIQUES TO IMPROVE TRANSLATION LOOKASIDE BUFFER REACH BY LEVERAGING IDLE RESOURCES

(71) Applicant: Advanced Micro Devices, Inc., Santa Clara, CA (US)

(72) Inventors: Jagadish B. Kotra, Austin, TX (US); Michael W. LeBeane, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 71 days.

(21) Appl. No.: 17/008,435

(22) Filed: Aug. 31, 2020

(65) Prior Publication Data
US 2022/0066946 A1 Mar. 3, 2022

(51) Int. Cl.
*G06F 12/1027* (2016.01)
*G06F 12/0862* (2016.01)
*G06F 12/0891* (2016.01)
*G06F 12/126* (2016.01)
*G06F 12/0846* (2016.01)

(52) U.S. Cl.
CPC ...... *G06F 12/1027* (2013.01); *G06F 12/0848* (2013.01); *G06F 12/0862* (2013.01); *G06F 12/0891* (2013.01); *G06F 12/126* (2013.01); *G06F 2212/1021* (2013.01)

(58) Field of Classification Search
CPC ............ G06F 12/1027; G06F 12/0848; G06F 12/0862; G06F 12/0891; G06F 12/126; G06F 2212/1021
See application file for complete search history.

(56) References Cited

U.S. PATENT DOCUMENTS

| 7,941,631 | B2 * | 5/2011 | Champagne | ........ G06F 12/1009 711/207 |
| 10,747,679 | B1 * | 8/2020 | Larson | ................ G06F 12/1027 |
| 2006/0206686 | A1 * | 9/2006 | Banerjee | ............. G06F 12/1027 711/205 |
| 2012/0137079 | A1 * | 5/2012 | Ueda | ..................... G06F 12/082 711/141 |

OTHER PUBLICATIONS

Talluri, M. and Hill, M. D., "Surpassing the TLB Performance of Superpages with Less Operating System Support", Proceedings of the Sixth International Conference on Architectural Support for Programming Languages and Operating Systems, 12 pgs., Oct. 1994.

(Continued)

*Primary Examiner* — William E. Baughman
(74) *Attorney, Agent, or Firm* — Volpe Koenig

(57) ABSTRACT

Techniques are disclosed for processing address translations. The techniques include detecting a first miss for a first address translation request for a first address translation in a first translation lookaside buffer, in response to the first miss, fetching the first address translation into the first translation lookaside buffer and evicting a second address translation from the translation lookaside buffer into an instruction cache or local data share memory, detecting a second miss for a second address translation request referencing the second address translation, in the first translation lookaside buffer, and in response to the second miss, fetching the second address translation from the instruction cache or the local data share memory.

20 Claims, 7 Drawing Sheets

(56) References Cited

OTHER PUBLICATIONS

Talluri, M., et. al., "Tradeoffs in Supporting Two Page Sizes", Proceedings of the 19th Annual International Symposium on Computer Architecture, 10 pgs., May 1992.
Pham, B., et. al., "Large pages and lightweight memory management in virtualized environments: Can you have it both ways?", 48th Annual IEEE/ACM International Symposium on Microarchitecture, 12 pages, Dec. 2015.
Mei, X. and Chu, X., "Dissecting GPU Memory Hierarchy through Microbenchmarking", IEEE Transactions on Parallel and Distributed Systems, vol. 28, Issue 1, 15 pgs., Jan. 2017.
Gaud, F., et. al., "Large Pages May Be Harmful on NUMA Systems", Proceedings of USENIX ATC '14: 2014 USENIX Annual Technical Conference, 13 pgs., Jun. 2014.
Jaleel, A., et. al., "Ducati: High-performance Address Translation by Extending TLB Reach of GPU-accelerated Systems", ACM Transactions on Architecture and Code Optimization, 16, 1, Article 6, 24 pages, Mar. 2019.
Young, V., et. al., "Combining HW/SW Mechanisms to Improve NUMA Performance Multi-GPU Systems", Proceedings of the 51st Annual IEEE/ACM International Symposium on Microarchitecture, IEEE, 13 pgs., Oct. 2018.

\* cited by examiner

TECHNIQUES TO IMPROVE TRANSLATION LOOKASIDE BUFFER REACH BY LEVERAGING IDLE RESOURCES

BACKGROUND

In many computer systems, memory is accessed via a virtual addressing scheme that requires translation from virtual addresses to physical addresses. Improvements to such schemes are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for managing address translations are provided. The techniques include detecting a first miss for a first address translation request for a first address translation in a first translation lookaside buffer; in response to the first miss, fetching the first address translation into the first translation lookaside buffer and evicting a second address translation from the translation lookaside buffer into an instruction cache or local data share memory; detecting a second miss for a second address translation request referencing the second address translation, in the first translation lookaside buffer; and in response to the second miss, fetching the second address translation from the instruction cache or the local data share memory.

Figure 1:
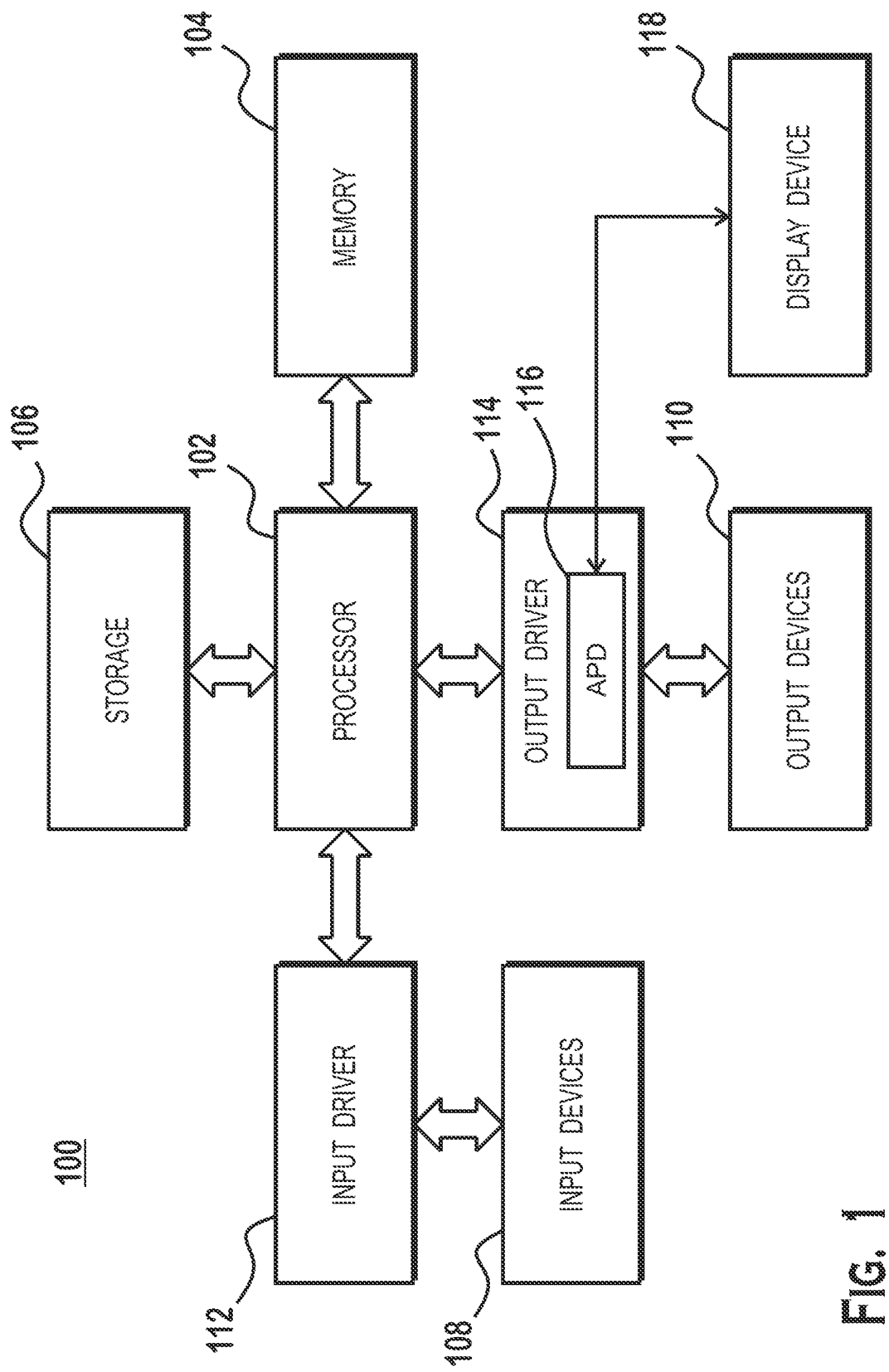
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
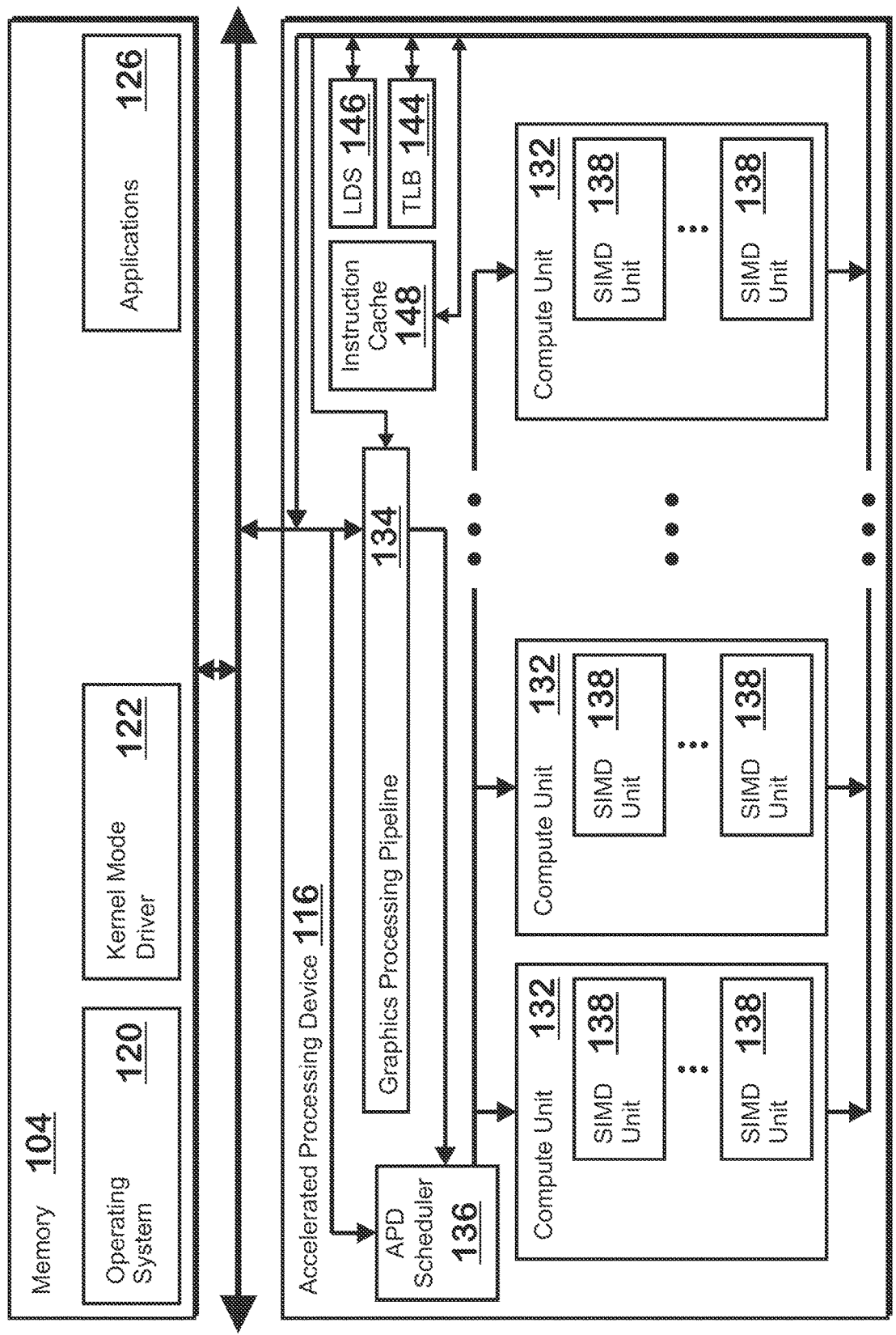
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 includes one or more instruction caches 148 arranged in one or more hierarchy levels. An instruction cache stores instructions for use by shader programs executing in the compute units 132. A cache manager (not shown) manages fetching instructions into the instruction cache 148 as needed.

The APD 116 includes a local data share ("LDS") 146. The local data share 146 is a memory that is accessible by the SIMD units 138 of the compute units 132. In some implementations, the access latency of the LDS 146 is lower than the access latency of memories outside of the compute units 132. In some implementations, each compute unit 132 has a separate LDS 146. In some implementations, instructions of compute units executing on the SIMD units 138 are able to explicitly specify locations with the LDS 146 at which to read or write memory.

The APD 116 includes one or more translation lookaside buffers 144. A translation lookaside buffer 144 caches virtual-to-physical memory address translations for use by the compute units 132 in accessing memory. For address translations not in the TLBs 144, a memory management unit attempts to fetch non-cached translations by performing a page table walk. In various implementations, the TLBs 144 include multiple levels in a translation lookaside buffer hierarchy.

Figure 3:
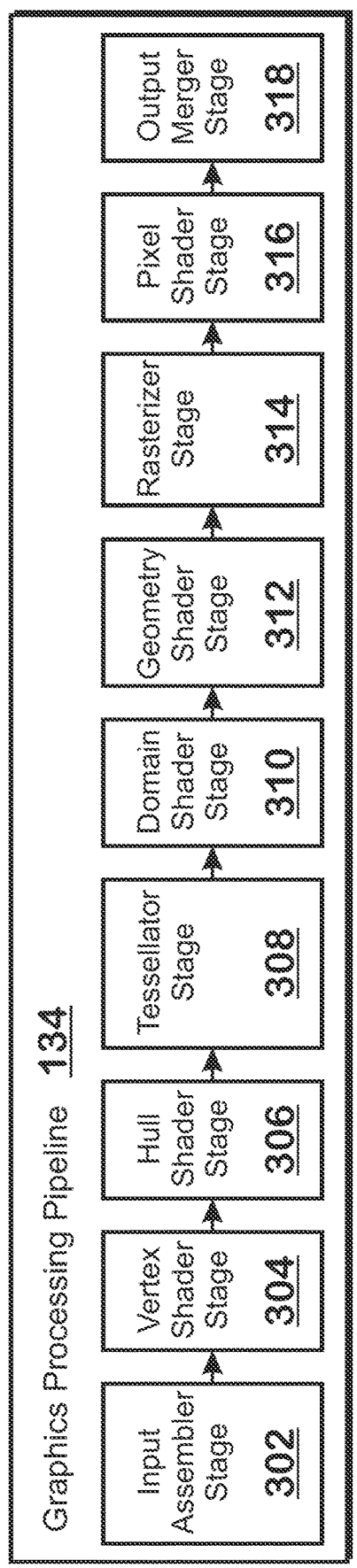
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

An implementation of an APD 116 is disclosed that includes a graphics processing pipeline 134 and that is capable of performing graphics rendering. However, the teachings of the present disclosure extend to implementations of the APD 116 that do not include a graphics processing pipeline 134 and thus do not perform graphics rendering utilizing such a pipeline.

Figure 4:
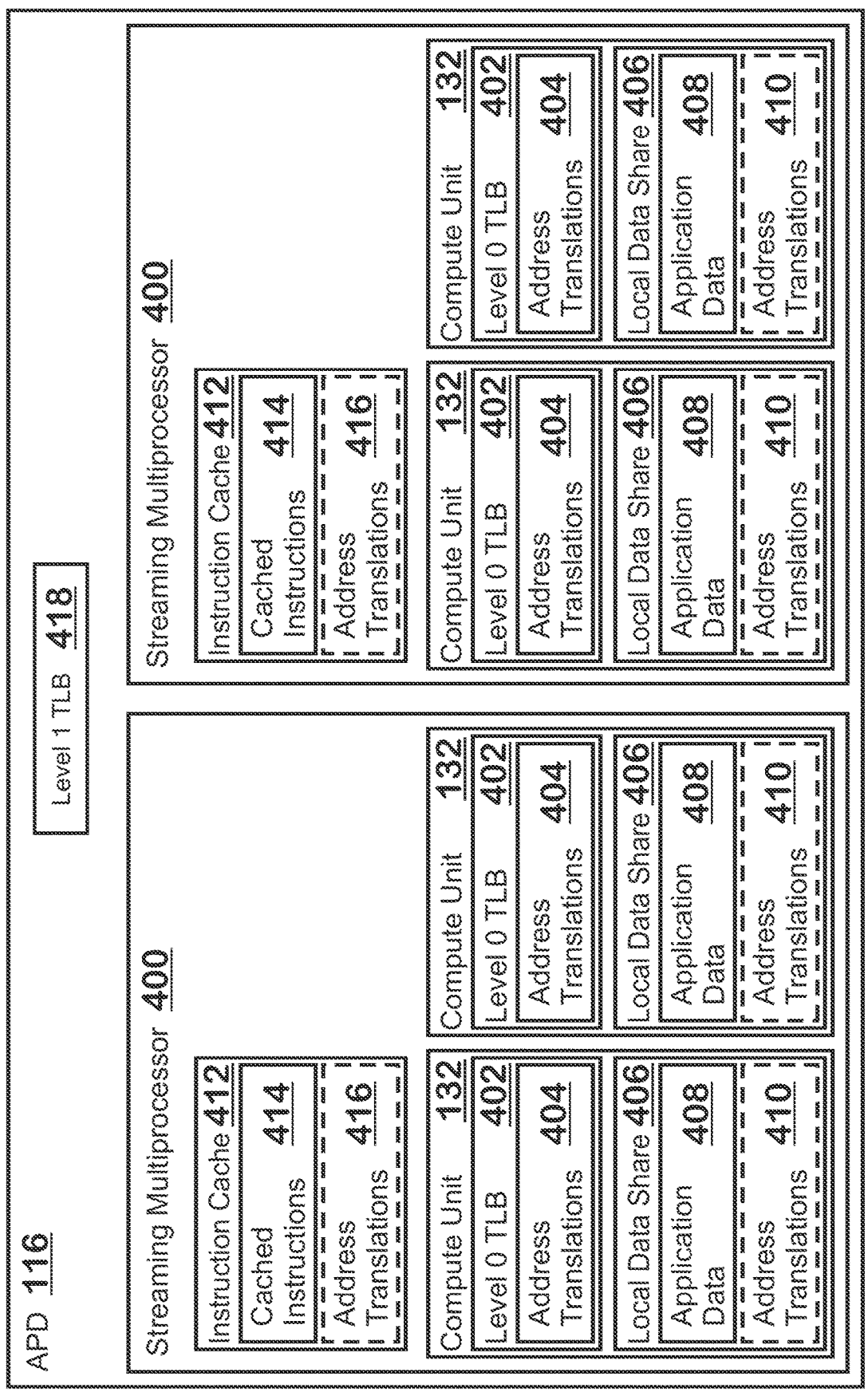
FIG. 4 illustrates details of the APD 116 of FIGS. 1-3, according to an example.

FIG. 4 illustrates details of the APD 116 of FIGS. 1-3, according to an example. In FIG. 4, several streaming multiprocessors 400 (sometimes referred to as "shader engines") are illustrated. Each streaming multiprocessor 400 includes two compute units 132. Each compute unit 132 includes a level 0 TLB 402 and a local data share 406. A streaming multiprocessor 400 also includes an instruction cache 412 that is shared between the two compute units 132 of the streaming processor 400. The APD 116 also includes a level 1 translation lookaside buffer 418. It should be understood that variations to the various hardware aspects above, such as number of elements (e.g., two compute units 132 per streaming multiprocessor 400) or whether a particular element is shared between other elements, are possible.

In operation, the translation lookaside buffers 402 provide virtual-to-physical address translations in response to memory accesses made by shader programs or other activity that accesses memory. In instances where a level 0 TLB 402 does not have a translation requested for a shader program, the compute unit 132 searches for the translation at another location in the memory hierarchy.

In implementations described herein, the compute units 132 utilizes a local data share 406 and an instruction cache 412 as a victim cache for virtual-to-physical address translations evicted from the level 0 TLB 402. More specifically, the local data share 406, in some instances, stores address translations 410, and the instruction cache 412, in some instances, stores address translations 416. Therefore, in some instances, in response to a compute unit 132 not finding a translation in a level 0 TLB 402, the compute unit 132 searches for such a translation in either or both of the local data share 406 or the instruction cache 412. In response to the compute unit 132 finding such a translation in the LDS 406 or instruction cache 412, the compute unit 132 utilizes that translation to perform the memory access requested by the shader program. In response to the compute unit 132 not finding such a translation in either the LDS 406 or instruction cache 412, the compute unit 132 searches for such a translation at another location, such as the level 1 TLB 418, or another TLB, or performs a page table walk.

Figure 5:
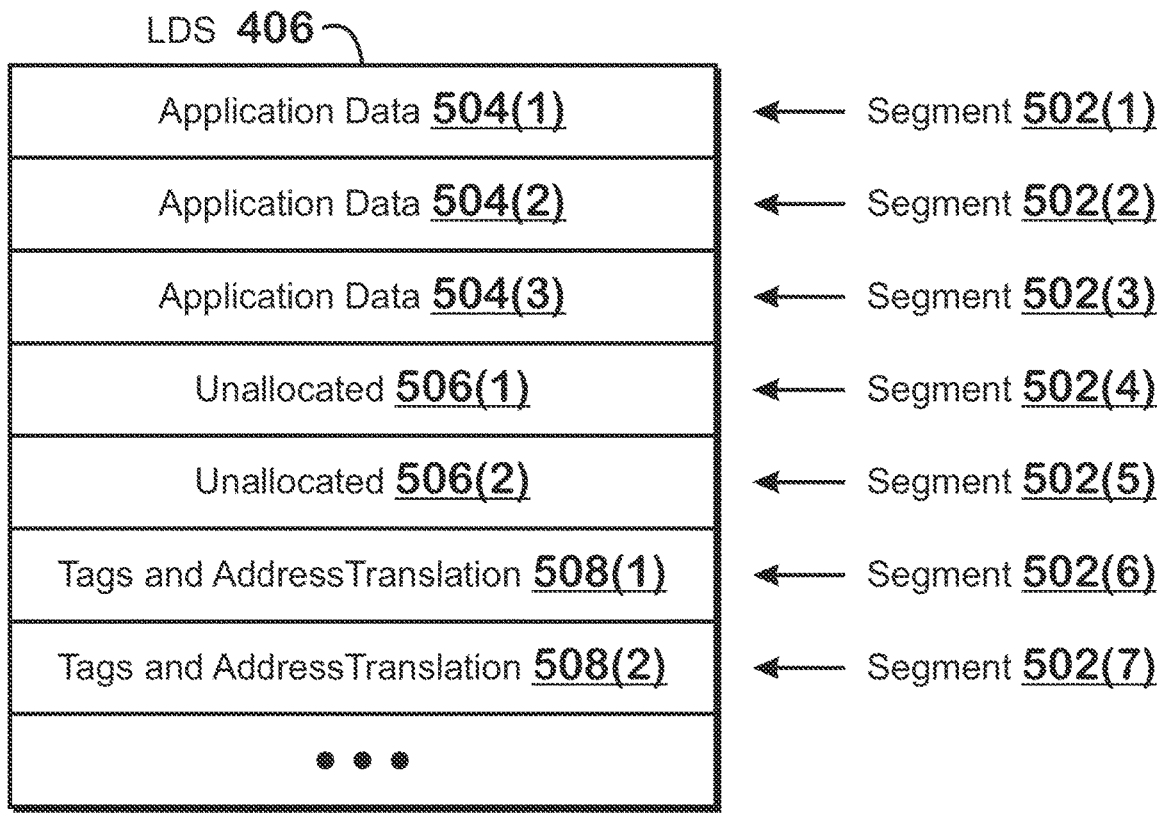
FIG. 5 illustrates a technique for storing and accessing virtual-to-physical address translations in an LDS, according to an example.
Figure 5:
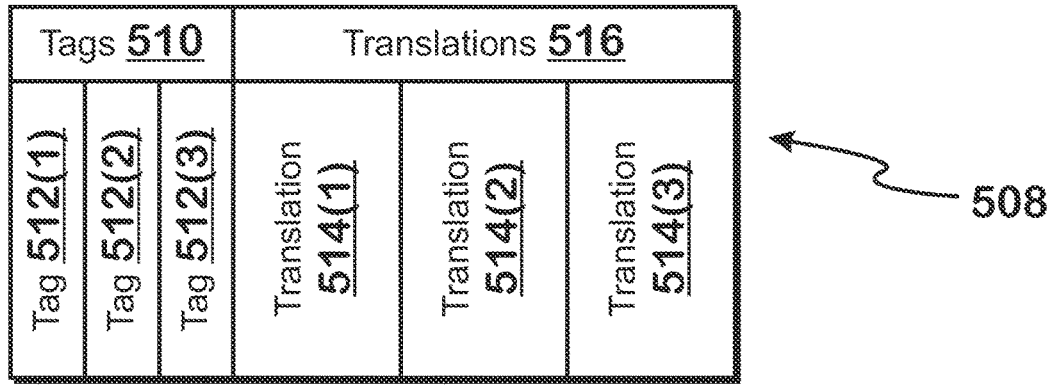
Figure 5:
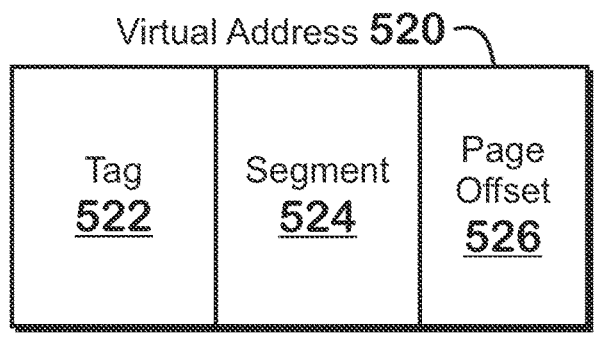

FIG. 5 illustrates a technique for storing and accessing virtual-to-physical address translations in an LDS 406, according to an example. As described elsewhere herein, the LDS 406 is a memory that stores data for use by the shader programs. The LDS 406 is divided into segments 502 that can be assigned to a wavefront of a workgroup (in which case the segment 502 stores application data 504), unallocated 506, or assigned to address translations 508.

The compute unit 132 allocates segments 502 to workgroups as workgroups are spawned for execution. (A compute unit 132 executes a workgroup by executing wavefronts that comprise that workgroup). In response to a workgroup completing execution, the compute unit 132 deallocates the application data 504, converting the segments 502 assigned to that workgroup into unallocated segments 506.

As described elsewhere herein, the LDS 406 serves as a victim cache for the level 0 TLB 402. More specifically, the compute unit 132 manages translations stored in the level 0 TLB 402. In response to a miss occurring in the level 0 TLB 402, the compute unit 132 obtains the translation from another location (such as the level 1 TLB 418, the LDS 406, or the instruction cache 412). The compute unit 132 places that translation into the level 0 TLB 402 and evicts another translation from the level 0 TLB 402 in the event that there are no free slots in the level 0 TLB 402. The compute unit 132 determines whether to place the fetched translation into the local data share 406. Specifically, the compute unit 132 determines an appropriate segment 502 for the translation based on the virtual address of the translation. In an example, the compute unit 132 identifies a subset of the bits of the virtual address and identifies a segment 502 of the local data share 406 based on those identified bits.

The compute unit 132 determines whether and how to store a translation evicted from the level 0 TLB 402 into the LDS 406 in the following manner. In the event that the segment 502 stores application data, the compute unit 132 determines that the translation is not to be stored in the LDS

406. In the event that the segment 502 is either an unallocated segment 506 or stores address translations 508, the compute unit 132 stores the translation evicted from the level 0 TLB 402 in the unallocated segment 506 or the segment storing address translations 508.

For a translation whose segment 502 stores unallocated space 506, the compute unit 132 creates a new tags and address translations 508 entry and places the tag and translation for the evicted translation into the new tags and address translations entry 508. For a translation whose segment 502 already stores tags and address translations 508, the compute unit 132 places the evicted translation into that segment 502, updating the segment 502 as appropriate. For a translation whose segment 502 is allocated to allocation data, such a translation cannot be stored in the LDS 406.

An example tags and address translations segment 508 is illustrated. The tags and address translations segment 508 includes a tags portion 510 and a translations portion 516. The tags portion 510 includes one or more tags 512 and the translations portion 516 includes one or more translations 514. The combination of tag 512 and segment 524 identifies a specific translation 514 of a specific tags and address translations entry 508. More specifically, as shown, a virtual address 520 includes a tag portion 522, a segment portion 524, and a page offset 526. The tag portion 522 and segment portion 524 uniquely identifies a virtual page number. A translation 514 is a physical page number that corresponds to the virtual page number for the corresponding virtual address.

The tags and address translations segment 508 includes multiple translations 514. In some implementations, once the appropriate segment 502 is identified, storing a translation for a virtual address into a tags and address translations segment 508 involves placing the tag 522 of the virtual address into a tag entry 512 of the tags portion 510 of the appropriate segment 502 and placing the physical page number into the translation entry 514 associated with the placed tag entry 512. In some implementations, tags entries 512 are linked with translation entries 514 based on the order in which those entries exist in the tags portion 510 and the translations portion 516 of the segment 502. More specifically, the tags entries 512 are stored in sequence in the tags portion 510 of a tags and address translations segment 508 and the translations entries 514 are stored in sequence in the translations portion 516 of a tags and address translations segment 508. The tag 512 in the same position in the sequence corresponds to the translation 514 in the same position in the sequence. For example, the second tag 512 of the tags portion 510 corresponds to the second translation 514(2) of the translations portion 516.

As described above, the compute unit 132 sometimes determines that a translation is to be placed into a tags and address translation segment 508 that already exists. It is possible for such a tags and address translation segment 508 to be either full (i.e., no slots are available for new translations) or not full. In the situation that the tags and address translation segment 508 is full, the compute unit 132 determines which translation in the tags and address translation segment 508 to evict to a different location, and stores the translation in the tags slot 512 and translations slot 514 corresponding to the evicted translation. It is possible to use any technically feasible replacement technique, such as least-recently-used, to determine which translation to evict. In some implementations, the tags portion 510 of a tags and address translations segment 508 stores information indicating which slots are empty or full, and/or indicating replacement information such as least-recently-used information. In the situation that the tags and address translation segment 508 is not full and the compute unit 132 is to place a translation into the tags and address translation segment 508, the compute unit 132 places the tags 512 translation into an empty tags slot 512 and translation slot 514.

In some situations, the compute unit 132 accesses a memory location by virtual address. In some such situations, the compute unit 132 obtains an address translation to physical address. In some such situations, such as where the level 0 TLB 402 does not contain that translation, the compute unit 132 checks the LDS 406 for the translation. To perform a lookup of a translation in the LDS 406, the compute unit 132 identifies which segment 502 is the appropriate segment for the virtual address. Specifically, the compute unit 132 identifies the segment 502 that is associated with the segment portion 524 of the virtual address. The compute unit 132 then attempts to identify the tag 512 that matches the tag portion 522 of the virtual address. If such a tag exists, then the compute unit 132 retrieves the physical page number in the corresponding translation entry 514 as the corresponding physical page number. If such a tag does not exist, then the compute unit 132 determines that the LDS 406 does not store the address translation. In this instance, the compute unit 132 obtains the address translation from a different component of the APD 116 or device 100.

Figure 6:
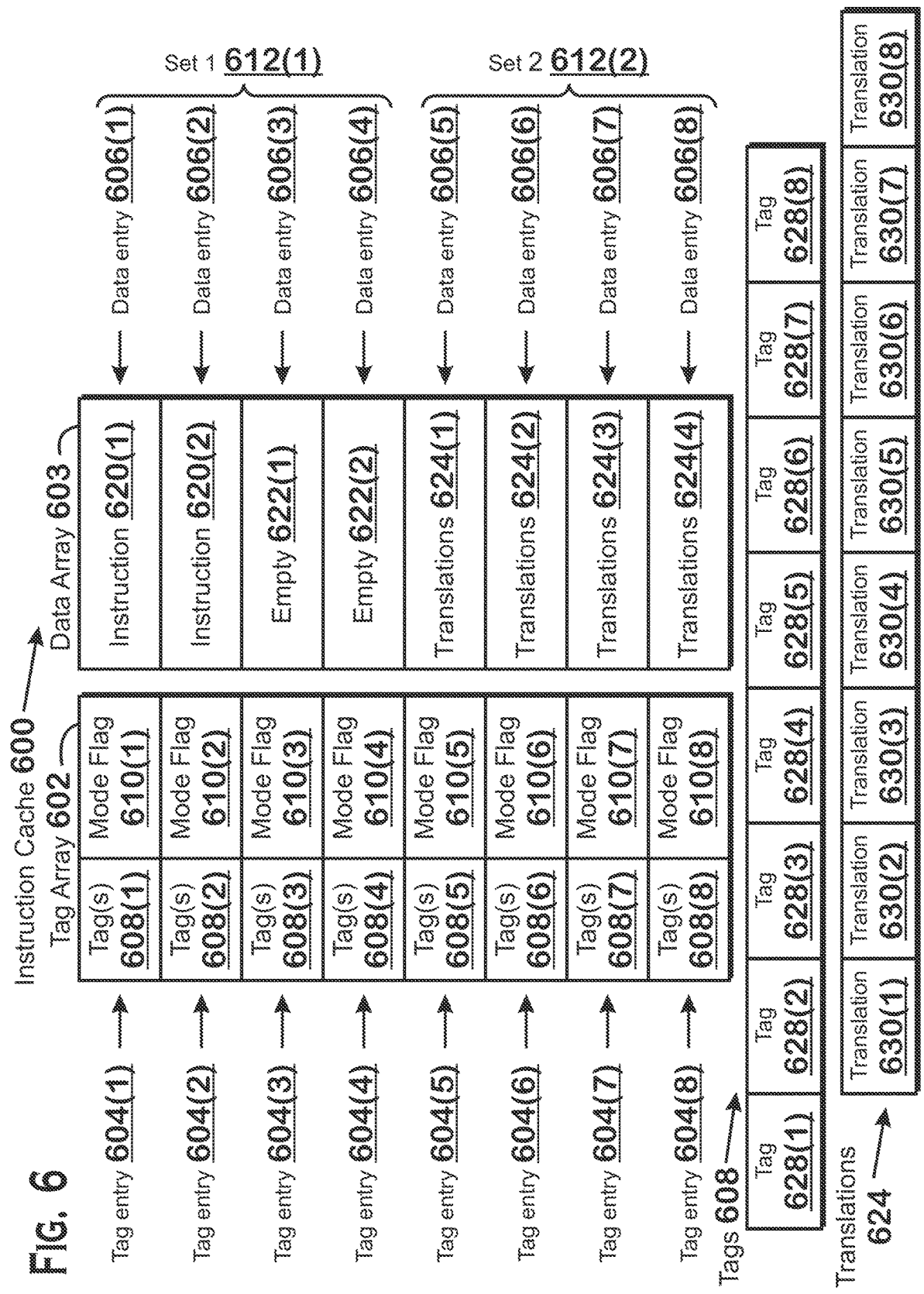
FIG. 6 illustrates an instruction cache, according to an example.

FIG. 6 illustrates an instruction cache 600, according to an example. The instruction cache 600 of FIG. 6 is an example implementation of the instruction cache 412 of FIG. 4. The instruction cache 600 includes a tag array 602 and a data array 603. The tag array 602 includes tag entries 604 and the data array 603 includes data entries 606. The tag entries 604 include tags 608 and mode flags 610. The data entries 606 store instructions or address translations, and can also be unallocated ("empty"). Unallocated data entries 606 store information that cannot be validly used as either address translations or instructions. Each tag entry 604 corresponds to a data entry 606. In the example, a tag entry 604 corresponds to the data entry 606 in the same row. The instruction cache (both tag array 602 and data array 603) is organized into sets 612, each of which includes multiple rows.

The compute unit 132 utilizes the instruction cache 600 as normal for storing instructions. For example, upon determining that a miss for a particular instruction occurs in the instruction cache 600, the compute unit 132 fetches the instruction and places the instruction into the instruction cache 600. In some implementations, each data entry 606 that stores instructions 620 stores at least one cache line of instructions. Some data entries 606 are "empty" data entries 622 in that those instructions do not store valid instructions (or translation). In various examples, data entries 606 become empty where the data entries 606 are invalidated (such as after a flush), or where the shader program for which the instructions are stored has completed. Moreover, the instruction cache 600 is set-associative, with example sets 612 being illustrated and including multiple data entries 606.

The compute unit 132 utilizes the instruction cache 600 for address translations in the following manner. In response to the compute unit 132 determining that an address translation is to be stored in the instruction cache 600 (such as when a translation is evicted from the level 0 TLB 402), the compute unit 132 identifies a data entry 606 associated with the translation. In one implementation, each data entry 606 is associated with a different virtual address segment value 524. Thus the segment value 524 of a particular virtual address uniquely identifies a data entry 606 of the instruction cache 600. Note that the number of bits of the segment value 624, used for the instruction cache 600, is not necessarily (but may be) the same number of bits of the segment value 624 (sometimes referred to as "index bits") used for the LDS 406.

The compute unit 132 determines whether the identified data entry 606 is used for instructions 620. If the data entry 606 is used for instructions, then the compute unit 132 determines that the entry is unable to be placed into the instruction cache. If the data entry 606 is empty 622, then the compute unit 132 stores the translation in that data entry 606. If the data entry 606 already stores translations 624, then the compute unit 132 places the new translation into that data entry 606. If the data entry 606 is not full of translations, then the compute unit 132 places the translation into an empty translation slot 630 of the data entry 606. If the data entry 606 is full of translations 630, then the compute unit 132 selects a translation 630 to evict to a different memory (such as a level 1 cache, not shown), and places the translation into the slot for the evicted translation. The compute unit 132 utilizes any replacement policy, such as least-recently-used, to determine which translation 630 to evict.

To obtain a translation from the instruction cache 600, the compute unit 132 identifies the data entry 606 corresponding to the virtual address to be translated (i.e., the data entry 606 corresponding to the segment 524 defined by the virtual address). If the identified data entry 606 stores instructions or is empty, then the compute unit 132 does not obtain the translation from the instruction cache 600 and obtains the translation from a different structure, such as the level 1 TLB 418. If the identified data entry 606 stores translations, then the compute unit 132 attempts to identify a tag 628 from the associated tag entry 604 by matching the tag portion 522 of the virtual address to a tag in the data entry 606. If such a tag exists in the data entry 606, then the compute unit 132 obtains the associated translation (which is a physical page number) as the translation for the virtual address. If such a tag does not exist in the data entry 606, then the compute unit 132 determines that a miss occurs and fetches the translation from a different structure, such as the level 1 TLB 418.

Note that in the implementation illustrated, when used for instructions, the instruction cache 600 is set associative by data entries 606 (i.e., sets 612 are formed by multiple data entries 606). However, when used for instructions, the instruction cache 600 is set associative within data entries 606 but not between data entries. More specifically, the "sets" for address translations are the data entries 606 themselves. This configuration, in which each data entry 606 is a set for the purposes of storing address translations, is an example implementation and many variations are possible. For instance, a set for translations could be more than one data entry 606. Restricting the size of a set (number of translations in each set) reduces the number of tag comparisons that are to be performed in a single cycle, thereby increasing speed. The specific associativity configuration described herein is not mandatory and any alternative may be used.

Figure 7:
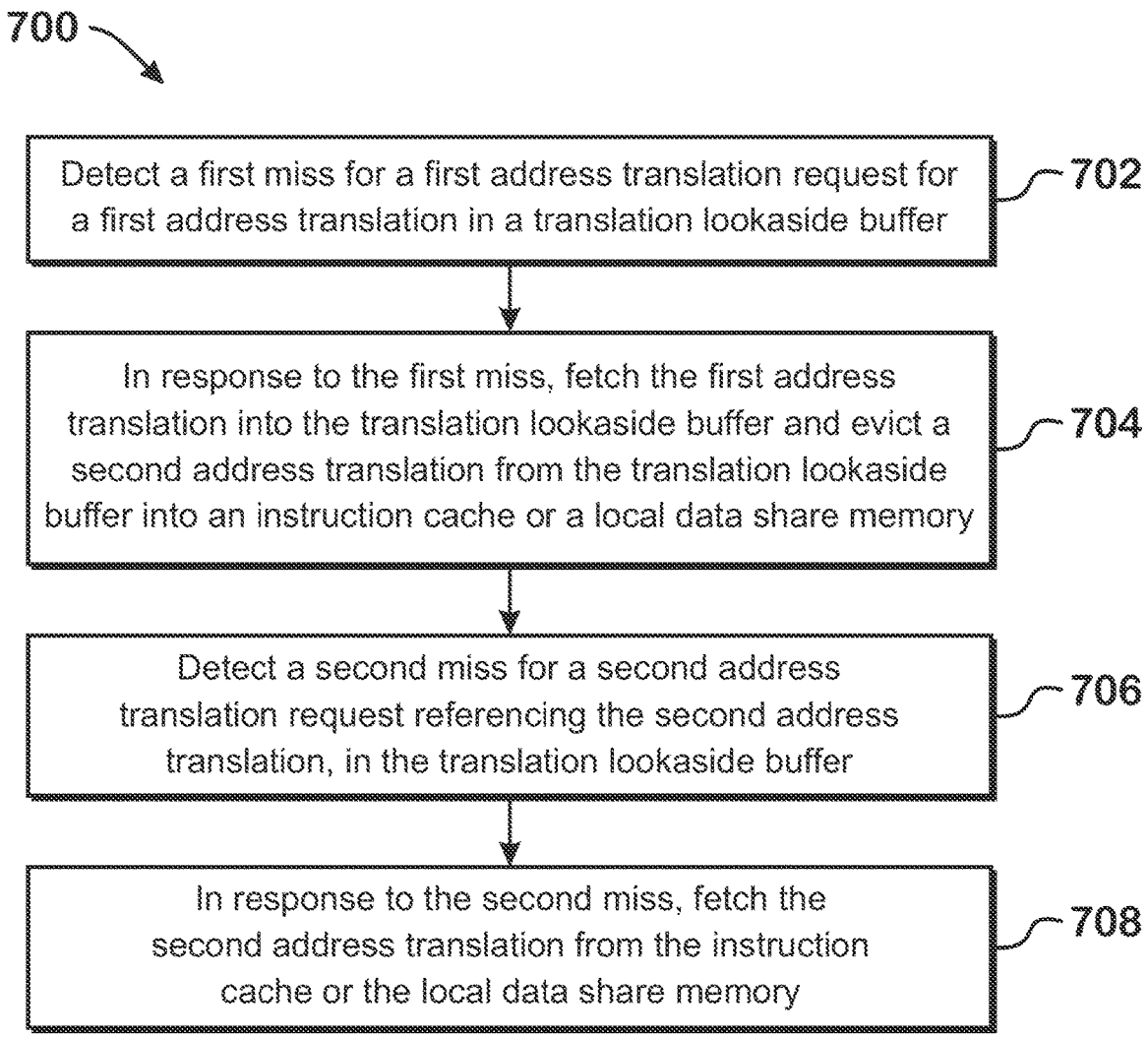
FIG. 7 is a flow diagram of a method for performing address translation using one or both of an instruction cache or a local data share, according to an example.

FIG. 7 is a flow diagram of a method 700 for performing address translation using one or both of an instruction cache or a local data share, according to an example. Although described with respect to the system of FIGS. 1-6, those of skill in the art will understand that any system, configured to perform the steps of the method 700 in any technically feasible order, falls within the scope of the present disclosure.

The method 700 begins at step 702, where a compute unit 132 detects a first miss for a first address translation request for a first address translation in a translation lookaside buffer such as the level 0 TLB 402. In some examples, the first miss occurs because an instruction of the compute unit 132 accesses memory at a virtual address for which the first address translation is requested. The translation lookaside buffer does not store the requested translation, so a miss occurs. At step 704, in response to the first miss, the compute unit 132 fetches the first address translation into the translation lookaside buffer. This fetching occurs in any technically feasible manner, such as examining one or more structures other than the translation lookaside buffer, for the translation. In an example, the translation lookaside buffer is a level 0 TLB 402 and the compute unit 132 searches one or more of one or more other translation lookaside buffers, an instruction cache 600, or a LDS 406 for the first address to fetch into the translation lookaside buffer.

Also at step 704, the compute unit 132 evicts a second address translation from the translation lookaside buffer into an instruction cache 600 or a local data share memory 406. This eviction is performed in response to the compute unit 132 determining that the second address translation occupies an entry in the translation lookaside buffer that is to be used for storing the first address translation, in any technically feasible manner, such as according to a replacement policy such as least-recently-used.

In some implementations, the compute unit 132 identifies the location to which to evict the second address translation by examining one or both of the instruction cache 600 and the local data share memory 406 to determine whether appropriate segments for the second address translation are "in-use" by an application. As described elsewhere herein, for the instruction cache 600, a data entry 606 of the instruction cache 600 is "in-use" by an application in the situation that the data entry 606 stores instructions 620, and is not in use by an application in the situation that the data entry 606 is empty 622 or stores translations 624. For the LDS 406, a segment 502 is in-use by an application if the segment 502 stores application data 504, and is not in use by an application in the situation that the segment 502 is unallocated 506 or stores tags and address translation 508.

The compute unit 132 selects one of the instruction cache 600 or the LDS 406 if the appropriate segment of either of those structures is not in use by the application. In one example, the compute unit 132 prioritizes the LDS 406 over the instruction cache 600 for evictions from the translation lookaside buffer. More specifically, the compute unit 132 places an evicted translation into the LDS 406 if there is an available segment 502 in the LDS 406, even if there is also an available data entry 606 in the instruction cache 600. If there is not an available segment 502 in the LDS 406, but there is an available data entry 606 in the instruction cache 600, then the compute unit 132 places an evicted translation into the instruction cache 600. If there is neither an available data entry 606 in the instruction cache 600 nor an available segment 502 in the LDS 406, then the compute unit 132 evicts the address translation to a different location such as another translation lookaside buffer or a different structure. In other examples, a different prioritization between the LDS 406 and the instruction cache 600 is used, such as instruction cache first 600 or another prioritization.

At step 706, the compute unit 132 detects a second miss for a second address translation request. The miss references the second address translation that is evicted at step 704.

Since the second address translation was evicted and is not in the TLB 402, the miss for that address occurs in the TLB 402.

At step 708, the compute unit 132 fetches the second address translation from the instruction cache 600 or the local data share memory 406. This fetching is done as described elsewhere herein, for example with respect to FIG. 5 or 6. For the instruction cache 600, the compute unit 132 identifies the data entry 606 associated with the virtual address for which translation is being requested. Then, the compute unit 132 determines which tag 628 of the tags 608 of that data entry 606 matches the tag of the virtual address and identifies the associated translation as the requested translation. For the LDS 406, the compute unit 132 identifies the segment 502 associated with the virtual address for which translation is being requested. The compute unit 132 determines which tag 512 of the tags portion 510 matches the tag of the virtual address and identifies the associated translation 514 as the requested translation.

In the present disclosure, although it is described that a compute unit 132 performs various actions related to managing or accessing address translations, in alternatives, a different unit such as a memory management unit (which would be implemented in hardware circuitry, in software executing on a processor, or as a combination of hardware circuitry and software executing on a processor) performs any or all of the address translation related actions described herein as being performed by the compute unit 132.

As described above, in some implementations, translations are placed into the LDS 406 and instruction cache 600 according to a prioritization scheme, where the translation is placed into the LDS 406 if possible, and if not, is placed into the instruction cache 600 if possible. It is possible for translations to be evicted from the LDS 402 as well, such as when a translation is evicted from the level 0 cache to the LDS 406, and that eviction itself causes an eviction from the LDS 406. In that instance, in some implementations, such translations evicted from the LDS 406 are evicted to the instruction cache 600 if possible.

Each of the units illustrated in the figures represent hardware circuitry configured to perform the operations described herein, and certain units of the graphics processing pipeline 300 are programmable and can thus execute programs.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
   detecting a first miss for a first address translation request for a first address translation in a first translation lookaside buffer;
   in response to the first miss, fetching the first address translation into the first translation lookaside buffer and evicting a second address translation from the translation lookaside buffer into an instruction cache or local data share memory;
   detecting a second miss for a second address translation request referencing the second address translation, in the first translation lookaside buffer; and
   in response to the second miss, fetching the second address translation from the instruction cache or the local data share memory.

2. The method of claim 1, wherein:
   evicting the second address translation into the instruction cache or the local data share memory includes prioritizing the local data share memory over the instruction cache.

3. The method of claim 2, wherein prioritizing the local data share memory comprising:
   determining that the second address translation can be stored into the local data share memory due to a first segment corresponding to the second address translation being empty or storing translations; and
   in response to the determining, storing the second address translation in the first segment.

4. The method of claim 2, wherein prioritizing the local data share memory comprises:
   determining that the second address translation cannot be stored into the local data share memory due to a first segment corresponding to the second address translation storing application data; and
   in response to the determining, storing the second address translation in the instruction cache.

5. The method of claim 1, wherein:
   evicting the second address translation from the translation lookaside buffer into the instruction cache or the local data share memory comprises evicting the second address translation from the translation lookaside buffer into the local data share memory; and
   evicting the second address translation into the local data share memory comprises: identifying a segment of the local data share memory based on a virtual address of the second address translation, and storing the second address translation into the segment.

6. The method of claim 1, wherein:
   evicting the second address translation from the translation lookaside buffer into the instruction cache or the local data share memory comprises evicting the second address translation from the translation lookaside buffer into the instruction cache; and evicting the second address translation into the instruction cache comprises: identifying a data entry of the instruction cache based on a virtual address of the second address translation, and storing the second address translation into the data entry.

7. The method of claim 1, wherein:
fetching the second address translation from the instruction cache or the local data share memory includes prioritizing the local data share memory over the instruction cache.

8. The method of claim 7, wherein:
prioritizing the local data share memory comprises searching the local data share memory for the second address translation prior to searching the instruction cache for the second address translation.

9. The method of claim 1, wherein:
fetching the second address translation from the instruction cache or the local data share memory comprises fetching the second address translation from the local data share memory; and
fetching the second address translation from the local data share memory comprises: identifying a segment of the local data share memory based on a virtual address of the second address translation, and fetching the second address translation from the segment.

10. A device, comprising:
a compute unit; and
a first translation lookaside buffer, wherein the compute unit is configured to:
  detect a first miss for a first address translation request for a first address translation in a first translation lookaside buffer;
  in response to the first miss, fetch the first address translation into the first translation lookaside buffer and evict a second address translation from the translation lookaside buffer into an instruction cache or local data share memory;
  detect a second miss for a second address translation request referencing the second address translation, in the first translation lookaside buffer; and
  in response to the second miss, fetch the second address translation from the instruction cache or the local data share memory.

11. The device of claim 10, wherein:
evicting the second address translation into the instruction cache or the local data share memory includes prioritizing the local data share memory over the instruction cache.

12. The device of claim 11, wherein prioritizing the local data share memory comprising:
determining that the second address translation can be stored into the local data share memory due to a first segment corresponding to the second address translation being empty or storing translations; and
in response to the determining, storing the second address translation in the first segment.

13. The device of claim 11, wherein prioritizing the local data share memory comprises:
determining that the second address translation cannot be stored into the local data share memory due to a first segment corresponding to the second address translation storing application data; and
in response to the determining, storing the second address translation in the instruction cache.

14. The device of claim 10, wherein:
evicting the second address translation from the translation lookaside buffer into the instruction cache or the local data share memory comprises evicting the second address translation from the translation lookaside buffer into the local data share memory; and
evicting the second address translation into the local data share memory comprises: identifying a segment of the local data share memory based on a virtual address of the second address translation, and storing the second address translation into the segment.

15. The device of claim 10, wherein:
evicting the second address translation from the translation lookaside buffer into the instruction cache or the local data share memory comprises evicting the second address translation from the translation lookaside buffer into the instruction cache; and
evicting the second address translation into the instruction cache comprises: identifying a data entry of the instruction cache based on a virtual address of the second address translation, and storing the second address translation into the data entry.

16. The device of claim 10, wherein:
fetching the second address translation from the instruction cache or the local data share memory includes prioritizing the local data share memory over the instruction cache.

17. The device of claim 16, wherein:
prioritizing the local data share memory comprises searching the local data share memory for the second address translation prior to searching the instruction cache for the second address translation.

18. The device of claim 10, wherein:
fetching the second address translation from the instruction cache or the local data share memory comprises fetching the second address translation from the local data share memory; and
fetching the second address translation from the local data share memory comprises: identifying a segment of the local data share memory based on a virtual address of the second address translation, and fetching the second address translation from the segment.

19. An accelerated processing device ("APD"), comprising:
a compute unit;
an instruction cache; and
a local data share memory,
wherein the compute unit is configured to:
  detect a first miss for a first address translation request for a first address translation in a first translation lookaside buffer;
  in response to the first miss, fetch the first address translation into the first translation lookaside buffer and evict a second address translation from the translation lookaside buffer into the instruction cache or the local data share memory;
  detect a second miss for a second address translation request referencing the second address translation, in the first translation lookaside buffer; and
  in response to the second miss, fetch the second address translation from the instruction cache or the local data share memory.

20. The APD of claim 19, wherein:
evicting the second address translation into the instruction cache or the local data share memory includes prioritizing the local data share memory over the instruction cache.

* * * * *